(12) United States Patent
Davis et al.

(10) Patent No.: US 6,596,120 B2
(45) Date of Patent: Jul. 22, 2003

(54) REFRACTORY LINED DUCTS AND COATING FOR USE THEREWITH

(75) Inventors: Victor M. Davis, Parkersburg, WV (US); Matthew S. Davis, Washington, WV (US)

(73) Assignee: Danser, Inc., Parkersburg, WV (US)

( * ) Notice: Subject to any disclaimer, the term of this patent is extended or adjusted under 35 U.S.C. 154(b) by 0 days.

(21) Appl. No.: 09/909,979

(22) Filed: Jul. 23, 2001

(65) Prior Publication Data

US 2002/0121309 A1 Sep. 5, 2002

Related U.S. Application Data

(60) Provisional application No. 60/272,302, filed on Mar. 2, 2001.

(51) Int. Cl.$^7$ ............................................... B29C 63/26
(52) U.S. Cl. ........................ 156/278; 156/294; 264/269
(58) Field of Search ............................... 156/294, 278, 156/280; 264/269, 87; 138/97, 98

(56) References Cited

U.S. PATENT DOCUMENTS

| | | | | |
|---|---|---|---|---|
| 2,949,704 A | * | 8/1960 | Jacobs | |
| 3,041,204 A | * | 6/1962 | Green | |
| 4,024,007 A | * | 5/1977 | Jago et al. | |
| 5,078,822 A | | 1/1992 | Hodges et al. | |
| 5,296,288 A | | 3/1994 | Kourtides et al. | |
| 5,569,427 A | * | 10/1996 | Semenova et al. | |
| 6,143,107 A | * | 11/2000 | Hounsel | |

* cited by examiner

Primary Examiner—Steven D. Maki
(74) Attorney, Agent, or Firm—Heller Ehrman White and McAuliffe

(57) ABSTRACT

The present invention is directed to ceramic fiber insulation and related products and methods. A coating that is capable of being brushed and/or sprayed lightly as a liquid onto vacuum-formed ceramic fiber insulation for use at high temperatures is also provided.

6 Claims, 2 Drawing Sheets

REFRACTORY LINED DUCTS AND COATING FOR USE THEREWITH

CROSS-REFERENCE TO RELATED APPLICATIONS

The instant application claims priority from Provisional Application 60/272,302, filed Mar. 2, 2001.

BACKGROUND OF THE INVENTION

1. Field of the Invention

The present invention relates generally to ceramic fiber insulation, and more particularly to methods and coatings for use with the same.

2. Description of Related Art

In many industrial applications it is necessary that conduits or ducts be provided for interconnection of various types of apparatus which require the routing of hot atmospheres or gases of many chemical compositions from one component to another. In most of these environments, the hot gases exhibit not only corrosive characteristics which will adversely affect conventional metallic conduits, but are also caused to flow at relatively high velocities. The relatively high gas flow velocity frequently encountered results in further adverse effects of frictional wearing and erosion of the interior of metallic ducts or other types of ductwork including but not limited to the increased likelihood of chemical corrosion. The relatively high temperatures also have a substantial adverse effect on the metal conduit such as decreasing structural strength and presenting a safety hazard to workers who may need to be in close proximity.

One technique heretofore utilized to meet the requirements of this highly adverse operational environment has been to line metallic or steel ducts with a castable refractory material. A disadvantage of the ducts having the castable refractory liner is that such refractories are not thermally efficient and as a consequence, the metal ducts which are lined with such materials must be made so as to develop greater structural strength to support the weight of the castable refractory that is required in most cases to meet the operational requirements.

There has also been an attempt to form ducts capable of withstanding the operational requirements of transmission of hot gases by lining metal conduits with a soft ceramic fiber material. The soft ceramic fiber material, as its name implies, does not exhibit the desired resistance characteristics to erosion by the relatively high gas velocities that are encountered. In an effort to meet the erosion effect, there have been attempts to also coat the interior surface of these liners with a layer of suitable material to attempt to rigidify the interior surface layers. These attempts have also not proven to be sufficiently successful as the rigidifying surface material will eventually crack and peel off and expose soft ceramic fibers to the point where the liners will erode and eventually become unusable, thus requiring replacement.

Another disadvantage of either the castable refractory liners or the soft ceramic fiber lining is the technique of obtaining the attachment or positioning of the liner within the metal conduit. The usual techniques require first securing of anchors to the interior of the metal duct. The refractory material is then either mechanically secured or it is formed directly onto those anchors such as by spraying or molding. Similarly, the soft ceramic fiber linings have been applied to the interior of the metal conduits by use of anchors which are first secured to the interior of the metal conduit.

Another attempt to meet the problems has been the formation of a vacuum cast sleeve or liner which is then subsequently assembled with a metal duct. This technique is not particularly advantageous in that it requires assembly at the operational site where the duct will be utilized. This technique increases the cost of installation.

In order to meet fire codes in terms of fireproof and fire resistance protection, insulation products must either have substantial mass or be endothermic in nature. Therefore, many insulation products must be treated or fabricated in such a way so as to give them such properties. Many endothermic materials are known. However, there are still problems associated with such materials and it would be desirable to have a material that is advantageous in terms of its end use properties and its ease of manufacture.

SUMMARY OF THE INVENTION

In accordance with these and other objectives, the present invention is directed to ceramic fiber insulation and related products and methods. The present invention further is directed to a ceramic coating that is capable of being brushed and/or sprayed lightly as a liquid onto vacuum-formed ceramic fiber insulation for use at high temperatures.

In a preferred embodiment, the instant invention provides a method for making refractory linings and insulation products wherein a ceramic fiber sleeve is positioned in and retained without the need for expansion joints and, in most applications, without utilization of mechanical attachment anchors, however the instant invention also contemplates the use of expansion joints and anchors as well. Preferred embodiments of the instant invention also provide ceramic fiber linings capable of handling gases of relatively high temperatures.

The instant invention also provides a ceramic fiber lined duct comprising a vacuum-formed ceramic fiber liner that has been treated with a coating affixed to a metal jacket.

In another preferred embodiment, the instant invention provides a method of making a duct capable of handling gases of relatively high temperatures and also having fire resistant, erosion resistant, and corrosion resistant properties fabricated by first forming a ceramic fiber sleeve and, while the sleeve is in a wet or hydrated state, positioning the sleeve within a metal tube and thereafter subjecting the assembly to a drying operation to remove moisture from the ceramic fiber sleeve. This method results in the sleeve and metal tube being mechanically and adhesively secured together into assembled relationship.

In another preferred embodiment, the instant invention provides a method of vacuum-forming a ceramic fiber insulation or lining conforming to the size and shape of a particular fitting or commercial heating component and positioning it within a metal jacket similarly to a ceramic fiber sleeve within a metal tube.

In another preferred embodiment, the instant invention provides a "clamshell" method for making ceramic fiber-lined metal-jacketed fittings or ducts of complex shapes which cannot be made with a single vacuum-forming operation. This involves forming sections or half sections of such a fitting or duct and combining them so as to make one complete fitting.

In another preferred embodiment, the instant invention provides a method for making refractory linings and insulation products wherein materials such as, but not limited to, mineral wool and/or graphite felt can be used in place of or in addition to ceramic fiber within the metal jacket of a duct, fitting or commercial heating component.

The instant invention also provides a refractory lining comprising a vacuum-formed ceramic fiber liner that has been treated with a coating. In a preferred embodiment, the instant invention provides a method of increasing fire resistance, thermal resistance, erosion resistance, and corrosion resistance of a vacuum-formed ceramic fiber lining comprising treating said ceramic fiber lining with a coating on a surface of said ceramic fiber insulation, wherein said coating renders said duct capable of being used at temperatures from about 2,300° F. to about 3,000° F.

In addition to the above applications, the coating's fire resistance, as opposed to merely heat resistance, as well as the coating's erosion resistant and corrosion resistant properties, make the present coating a desirable coating for vacuum-formed ceramic fiber products. In this case, as in the above applications, the coating would preferably be brushed and/or sprayed lightly onto the hot face of ceramic fiber insulation, whether or not the insulation contains an outer steel jacket.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF A PREFERRED EMBODIMENT

Figure 1:
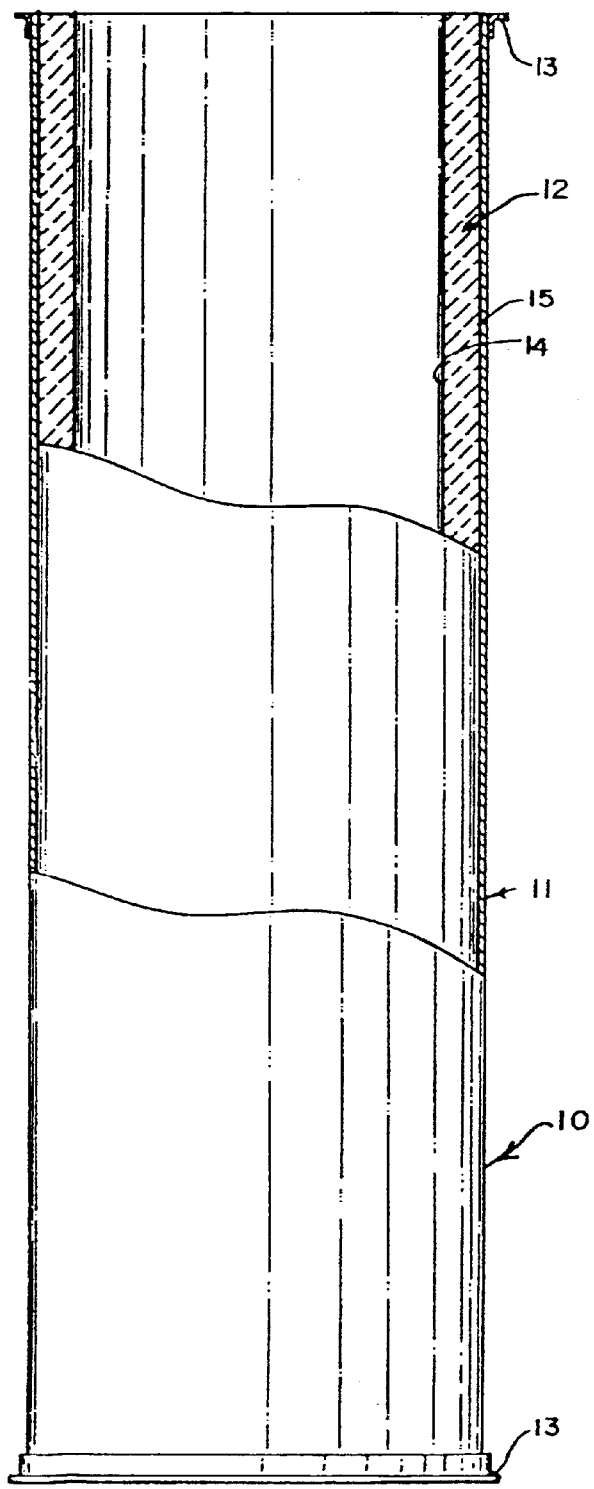
FIG. 1 is an elevational view of a duct formed in accordance with the method of this invention with portions of the elements removed for clarity of illustration.

In a preferred embodiment, the present invention relates to high-temperature vacuum-formed ceramic fiber insulation, as well as to a coating which can be applied to ceramic fiber products so as to make them more resistant to erosion and corrosion caused by extreme velocity in high-temperature airflow within ductwork and by particulate matter in that airflow. The invention further relates to improvements in refractory liners for ducts or conduits, and particularly to ducts or conduits having a ceramic fiber liner functioning as a refractory to accommodate the corrosive and abrasive characteristics of hot gases designed to be routed through such conduits or ducts. It further relates in particular to a method for making of a duct having a refractory liner of ceramic fiber.

As used herein a duct is a metallic enclosed vessel or conveyance including, but not limited to, a pipe, tube, or channel.

Suitable high emissivity coatings are disclosed, for example, in U.S. Pat. No. 5,296,288, the content of which is incorporated herein by reference in its entirety. For example, a coating of the instant invention generally comprises a mixture of: silicon oxides such as silicon dioxide powder and colloidal silicon dioxide; water, preferably de-ionized; one or more emissivity agents; and optional organic elements as additives to extend shelf life.

An emissivity agent is an agent which radiates heat into the duct and away from the lining. Typical emissivity agents of the instant invention include, but are not limited to polyborides such as silicon hexaboride or silicon tetraaboride, silicon carbide, molybdenum disilicide, tungsten disilicide and zirconium diboride.

In one preferred embodiment the coating comprises a mixture of silicon dioxide power in an amount of from about 23.0 to about 44.0 wt %; colloidial silicon dioxide in an amount from about 25.0 to about 45.0 wt %, water in an amount from about 19.0 to about 39.0 wt %, and an emissivity agent preferably is in the form of a powder. The protective coating can have a solids content of from about 40 to about 60 wt %.

The present coating is especially resistant to hostile environmental conditions, such as air velocity, temperature, acidity, water vapor or steam, etc. The coating is suitable for withstanding the same temperature range as the ceramic fiber lining itself, for example about 2,300° F. to about 3,000° F.

The protective coating can easily be prepared, for example, by preparing a slurry of the components of the coating, and then ball milling the slurry to provide a uniform solid dispersion which is then further mixed together.

It has unexpectedly been found that the coating according to the present invention is highly resistant to fire. Accordingly, in a preferred embodiment, the instant invention provides a vacuum-formed ceramic fiber insulation or liner treated with a coating of the present invention. In this way, the treated ceramic fiber insulation or liner is resistant to erosion caused by air velocity, to particulate matter in such an air stream, to corrosion caused by acid, moisture, fire and extreme heat.

The instant coating may be applied to a ceramic fiber lining or insulation by any method commonly employed in the art, such as brushing or spraying.

The present coating is particularly advantageous for use with: (1) ductwork that is adapted for high velocity airstreams, (2) ductwork that is used for airstreams having particulate matter; (3) ductwork that regularly is exposed to airstreams having an acidic content therein and/or (4) ductwork that accepts airstreams having a high moisture content. Because of its inherent fire and heat resistant properties, the present coating may also be used for high-temperature applications such as those at or above about 2,300° F. Often it may be cost-effective to apply the coating as a heat barrier, thereby permitting a reduction of the wall thickness of the insulating ceramic fiber. In the case of steel-jacketed ceramic fiber products such as Danser Inc.'s commercially available VACUDUCT® product, the coating's heat barrier may also permit a reduction in the diameter and amount of the steel necessary to enclose the insulating layer of ceramic fiber. For example, the thickness could be reduced by about 5–50%.

Particularly challenging duct environments may require two applications of the coating. First a dilute application, for example, from about 10% to about 90% strength, and more preferably from about 10% to about 15% strength) may be applied so as to maximize absorption into the relatively porous density of vacuum-formed ceramic fiber, which may be approximately 17 lbs./cu. ft. This dilute application can then advantageously be followed by a full-strength application to maximize the impervious nature of the barrier to air velocity, particulate matter, acid, moisture and heat.

The instant coating is suitably applied to materials, such as refractory liners or refractory liners with passive fire resistance, due to its high emissivity. The present coating's high emissivity qualities are greatly advantageous over prior endothermic materials. Coated ceramic fiber insulation according to the present invention is generally capable of meeting appropriate ASTM, NFPA and UL fire prevention standards.

A coating composition for coating the interior of ceramic materials such as ceramic fiber-lined ducts of the present invention act to direct thermal energy toward a load in the duct wherein the duct reaches a temperature of above about 1100° C., thereby increasing the thermal efficiency and also the fire resistance of the interior of the ductwork.

In a preferred embodiment, the instant invention provides high-temperature vacuum-formed ceramic fiber insulation for ductwork. U.S. Pat. No. 5,078,822, the content of which is incorporated herein by reference in its entirety, discloses a refractory lined duct, fitting, or component having a sheet metal outer jacket or "skin" lined on the inside with a ceramic fiber matrix bonded with binder materials forming a refractory lining of predetermined shape, thickness, and thermal characteristics. This duct's refractory lining is held in fixed, retained relationship with the exterior sheet metal jacket solely by frictional and adhesive forces inherent in the art of the invention.

A method for making the duct, fitting, or component includes the steps of vacuum-forming a refractory inner lining, conforming to the shape of the sheet metal outer jacket, from a slurry of ceramic fibers and binder materials onto a forming die, inserting the ceramic fiber lining while in a hydrated state into the sheet metal supporting jacket or casing of complementary shape and size such that adjacent surfaces of the jacket and sleeve are in contacting engagement, and then drying the assembly to remove the water resulting in the formation of a hard, solid-structure refractory liner that is fixed in the tube solely through frictional and adhesive forces inherent in the art of the invention. A modified duct, or fitting, formed by the same methodology includes a composite refractory liner formed from a plurality of tubular liners that each have their own respective structural, physical and thermal characteristics.

The present invention further provides refractory lined ducts, fittings or components having sheet metal jackets or casings lined with a ceramic fiber matrix bonded with binder material forming refractory liners of predetermined thickness and thermal characteristics. For example, liner thicknesses range preferably from about 1 to about 8 inches and more preferably from about 2 to about four inches with thermal characteristics when dry of a low density insulation which is also low in thermal conductivity and highly resistant to thermal shock. The duct has the refractory liner held in fixed, retained relationship with its outer metal jacket solely by frictional forces and adhesive bonding by the binder material. A modified duct or fitting formed by the same methods includes a composite refractory liner formed from a plurality of tubular liners that each have their own respective structural, physical and thermal characteristics. It is also possible to render such materials erosion resistant, corrosion resistant, and fire resistant or even fireproof by applying a coating such as corrosion resistant coatings and/or coatings of the instant invention.

In accordance with this invention, there are also provided methods for making the instant refractory lined ducts, fittings or components. In a preferred embodiment, a ceramic fiber inner lining is positioned in and retained within a metal jacket or casing. In accordance with this preferred embodiment, a duct capable of handling gases of relatively high temperatures, for example, 2300° F., and also having corrosive properties, is fabricated by first forming of a ceramic fiber inner lining and, while the lining is in a wet or hydrated state, positioning the lining within the metal jacket and thereafter subjecting the assembly to a drying operation to remove moisture from the ceramic fiber lining. This method results in the lining and metal jacket being mechanically and adhesively secured together into an assembled relationship.

The ceramic fiber lining can be formed, for example, by well-known operations for vacuum-forming of such articles through placement and forming of the ceramic fibers onto a forming die. The ceramic fibers are formed in a layer on the die to form a fiber lining having an outside diameter or shape that is at least equal to, if not slightly larger than the interior diameter or chamber of the metal jacket or casing into which the lining is to be placed. While in a wet condition, the die-supported fiber lining is inserted into the metal jacket and the die is removed either at a point in time where the ceramic fiber lining is partially inserted within the jacket or when it is fully inserted. After the die is removed from the ceramic fiber lining, the assembled metal jacket and ceramic lining are placed in an oven wherein the elevated temperature of the oven and airflow is sufficient to effect evaporation of the water from the ceramic fiber lining.

Preferably, a method for making the instant duct, fitting, or component comprises the steps of vacuum-forming a refractory inner lining from a slurry of ceramic fibers and binder materials onto a forming die, inserting the ceramic fiber lining while in a hydrated state into the sheet metal supporting jacket or casing of complementary shape and size such that adjacent surfaces of the jacket and sleeve are in contacting engagement and then drying the assembly to remove the water resulting in forming of a hard, solid structure refractory liner that is fixed in the tube solely through frictional and adhesive forces inherent in the art of the invention.

The ceramic fiber lining is of a size such that when it has been dried, it will mechanically engage with the interior surface of the metal jacket and be at least partially retained therein through frictional and adhesive forces resisting relative axial displacement. The instant invention is particularly suited for predetermined shapes, configurations and sizes of metal jacketed ceramic fiber lined ducts, fittings or components in sizes, for example, ranging from an inner diameter of two inches to an outer diameter of eight feet.

In accordance with another aspect of this invention, a conduit assembly or fitting having multiple ceramic fiber liners is provided through sequential formation and insertion of two or more ceramic fiber liners into a metal jacket or casing. This aspect of the invention enables a ceramic fiber liner adapted to lower temperature applications to be first placed within the conduit and then a second ceramic fiber liner adapted for higher temperature applications inserted and secured in a similar manner.

In a preferred embodiment, the invention provides a method of making refractory lined ducts having an elongated, structurally supporting tube and a ceramic liner carried on an interior wall of the duct comprising forming a sleeve of ceramic fiber and binder materials on a structurally supportive die in a hydrated state by vacuum-forming wherein said sleeve has an external wall of a configuration that is geometrically and dimensionally complemental to the interior wall of the supporting duct to form an interference fit therewith effective in mechanically retaining said sleeve and duct in fixed interengagement; inserting the sleeve, while in a hydrated state and on the die, coaxially into the supporting tube and after insertion, removing the die from the sleeve; and drying the sleeve while said sleeve is maintained in fixed position within the supporting tube to remove substantially all liquid resulting in solidification of the sleeve in a frictionally and adhesively retained relationship with the supporting tube.

A preferred embodiment is illustrated in FIG. 1, wherein a refractory lined duct 10 embodying this invention and formed in accordance with the method is shown with portions broken away for clarity of illustration. The duct 10 includes a structurally supporting tube 11 and a refractory liner 12. The tube 11 is formed from a suitable material for the particular installation and may most commonly be formed of sheet steel. The size of the duct 10 is also dependent upon the particular installation for which the duct is designed as is the diameter. As an example, duct embodying this invention may have a nominal diameter in the range of about 2 to about 100 inches, more preferably about 8 to about 50 inches with the liner itself having a thickness of the order of 3 inches. Duct of this type frequently is required in installations where there are large volumes of gaseous materials that must be transported from one location to another, and accordingly, large-size ducts are preferred to reduce velocities while maintaining sufficient capacity to handle the volume of gas.

The supporting tube 11 which is indicated to be fabricated of sheet steel may be of a type that is formed by spiral winding techniques of elongated strips of steel with the adjacent edges being mechanically interlocked. FIG. 1 does not illustrate specifics of detail of the structure of the tube 11 as that does not form a part of the invention and is dependent upon a particular design. However, the tubes 11 are generally provided with end flanges 13 which provide a means for mechanically interconnecting a number of such ducts in serial alignment. These flanges are generally drilled to accommodate fastening bolts. Again, the technique of interconnecting adjacent duct in end-to-end relationship is a matter of mechanical design and is of a type selected to be appropriate for a particular installation and the details are not a part of this invention.

In accordance with this invention, the refractory liner 12 is retained in position within the interior of the supporting tube 11 through a combination of frictional and adhesive forces as between the contacting wall surfaces of the liner and the tube. As can be seen in FIG. 1, the liner 12 has an inner wall surface 14 which is termed "The Hot Face" and an outer wall surface 15 which is termed "The Cold Face". One of the functions of the refractory liner 12 is to provide thermal insulation and thus have a characteristically low thermal conductivity such that the cold face will not exceed predetermined temperatures for a particular application. This is advantageous to reduce the mechanical stresses that must be accommodated by the supporting tube 11 as well as enhancing safety in the environment as it concerns workers who must operate in the processing installation in which such duct may be installed.

In accordance with this invention, the refractory liner 12 is formed from ceramic fibers which are held in a matrix by suitable binders. The ceramic fibers that are particularly useful for a refractory liner of this type and for high-temperature installations comprise a combination of alumina-silica fibers and aluminum oxide fibers. These fibers which are of small cross-sectional shape are held in a matrix by means of binders which may include combinations of colloidal silica binders and cationic starch binders. These materials are mixed in a slurry composition which, through a vacuum-forming process, can be fabricated into a tubular shape such as the illustrative refractory liner, or into virtually any shape complementary to an outer steel jacket or casing. The specific materials, their proportions in the composition, are known in the art and the specifics are not deemed of importance to the invention other than to note that the materials are selected in accordance with known techniques to form a refractory which will have the desired thermal and structural characteristics.

In another preferred embodiment, the instant invention provides for the addition of a plasticizing agent in the ceramic slurry mix to reduce brittleness of individual ceramic fibers in the finished product thereby reducing erosion and thermal shock of the finished product when it is in operation.

In another preferred embodiment, the instant invention provides for the addition of a de-wetting agent in the ceramic slurry mix to accelerate drying of the finished product after it has been removed from the die.

Vacuum-forming of a tubular liner such as that which is illustrated is conventionally accomplished by vacuum-forming techniques with the ceramic fibers and binder being collected on an elongated tubular die. This forming technique is diagrammatically illustrated in FIG. 2 where an elongated die 16 is shown with a quantity of the ceramic fibers and binder collected on its exterior and thus forming an elongated tube. In the initial forming stages, the ceramic fiber and binder matrix is in a highly hydrated state, although it will be sufficiently compacted with the binder material functioning to adhesively secure the fibers in a structurally self-supporting shape. The refractory liner at this stage can be handled and moved for performance of other operations to complete its fabrication. Such tubular refractories are utilized in other applications than that of the invention and, for such purposes, the article subsequent to the initial vacuum-forming operation is subjected to a drying operation such as by placing the article in a conventional oven and circulating air for evaporation of the moisture which is predominantly water. In another preferred embodiment, the lining, subsequent to the initial vacuum-forming operation, is subjected to a drying operation in a microwave oven wherein penetrating microwave energy and airflow are sufficient for evaporation of moisture. In either type of drying environment the temperatures and drying times are dependent upon the particular characteristics of the fiber lining as to its physical size and moisture content. The article as thus formed in accordance with prior art practices is a structurally solid article that can be mechanically placed and secured in specific installations.

Figure 2:
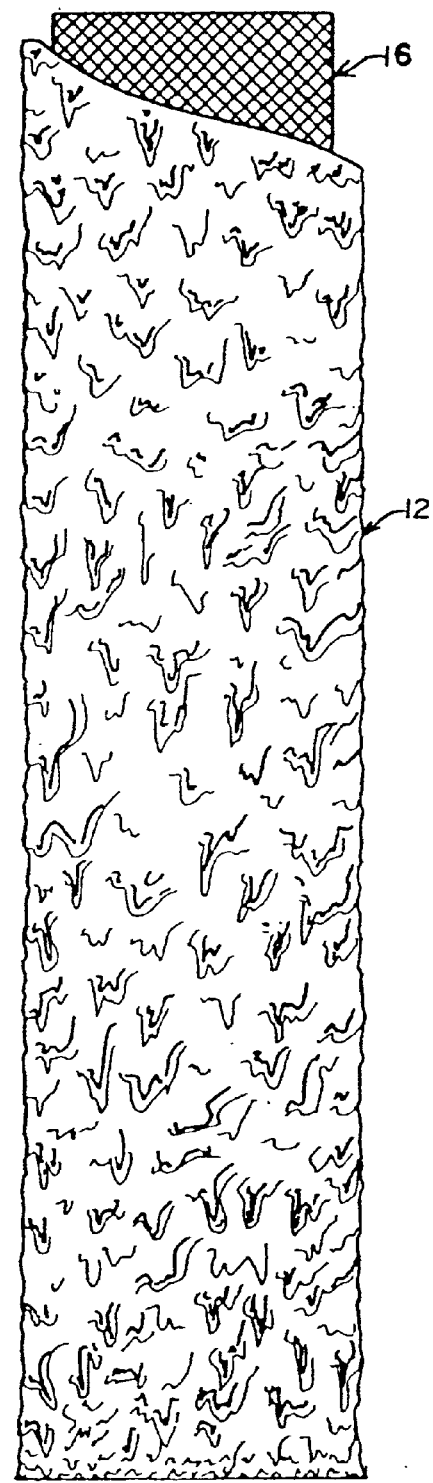
FIG. 2 is an elevational view of a ceramic fiber sleeve formed by a vacuum process onto a die.

However, in accordance with the method of invention for forming the duct embodying this invention, the tubular refractory liner 12 while in a wet hydrated state is first positioned within the interior of the supporting tube 11 prior to being subjected to a drying operation. Depending upon the state or degree of hydration of the liner, it may be advantageous to dry the liner to an extent where it will have adequate structural integrity to enable its assembly with the tube. To form a duct 10 embodying this invention, the refractory liner 12 is formed with an exterior diameter that is at least equal to or advantageously slightly larger than the inside diameter of the supporting tube 11. For example, in the case of a supporting tube 11 having a diameter in the range of about 2 to abut 100 inches, more preferably about 8 to about 50 inches, the exterior diameter of the liner 12 as fabricated by the vacuum-forming process may be one-fourth inch larger to better assure that there will be a mechanical engagement as between the liner and tube to result in the desired frictional forces for retaining the liner within the tube. Assembly of a vacuum-formed liner with the tube 11 is diagrammatically illustrated in FIG. 3. While the refractory liner 12 is in a hydrated state and still retained on the forming die 16, it can be easily lifted and slid axially into the upper open end of the tube 11. The tube 11 would be supported on a transporting plate or other carrier device and the liner 12 as it slides down into the tube 11 would also come to rest on that supporting plate. As the liner 12 is slid into the tube, excess refractory material may be skinned or shaved off from the exterior surfaces or realigned onto the surface forming a continuous contacting surface engagement with the interior of the supporting tube 11. A refractory liner in a hydrated state does not have a smooth surface as the material has a tendency to flow to a certain degree and this is illustrated in FIG. 2 by the rough surface conformation. When the liner is at least partially inserted within the tube, the forming die 16 may be removed. This may be accomplished by mechanical rotation of the die which will break the surfaces loose and enable the die to be withdrawn. Once the die has been withdrawn, the hydrated liner will continue sliding down into the tube until it comes to rest on the bottom supporting plate.

Once the hydrated liner is fully positioned within the tube, the assembly may then be subjected to a drying procedure. This drying procedure follows that previously described in connection with forming of refractory articles of a more conventional nature. Such a procedure as indicated comprises placing the article into an oven which is at a sufficiently elevated temperature, or utilizes microwave energy, so as to cause evaporation of the water in the liner. Air is circulated around the articles to aid in removal of the water vapor and thereby hasten the drying process. A drying apparatus is not shown as such is well-known in the art as are the operating techniques as to temperature and airflow. The operation does continue until the water is evaporated at which time the refractory material is fully solidified. This process also completes forming of the inter-fit of the liner to the interior of the tube to result in generation of frictional and adhesive forces which prevent the removal of the liner from the supporting tube. Thus, in accordance with this invention, a duct 10 having a refractory liner is provided which does not require the use of any other mechanical means for securing the refractory liner within the interior of the tube.

Figure 4:
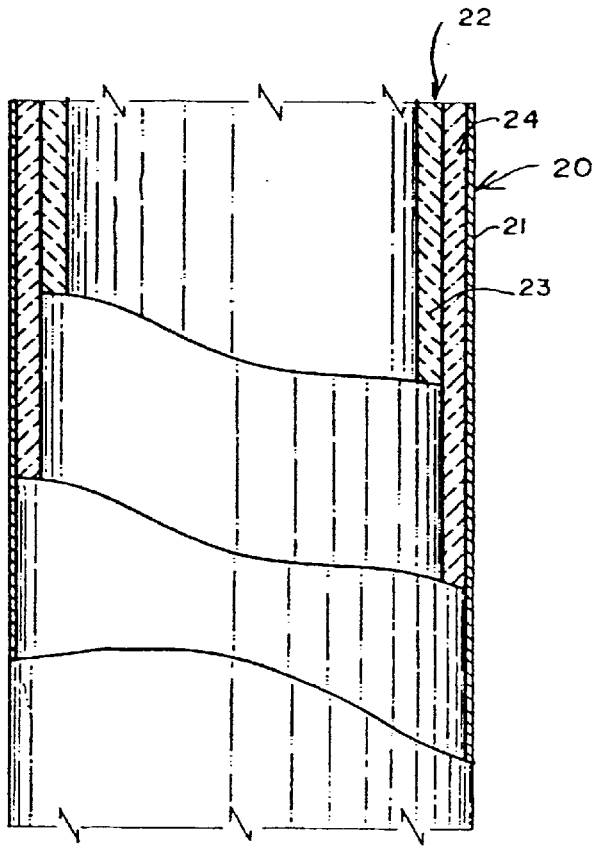
FIG. 4 is an elevational view of a section of conduit formed in accordance with the method of this invention and having multiple refractory liners.

A modified duct 20 also fabricated in accordance with the method of this invention and thus embodying the advantageous structural arrangement is shown in FIG. 4. This duct also includes a structurally supporting tube 21 and a refractory liner designated generally by the numeral 22. However, in this modification, the liner 22 comprises a plurality of tubular refractory liners with two ceramic fiber liners 23 and 24 shown which are disposed in coaxial relationship to each other and to the supporting tube 21. Utilizing two liners 23 and 24 to form a composite refractory liner 22 permits each of the liners to be fabricated from different combinations of materials. By appropriately proportioning the types of ceramic fibers that are selected and the binder materials, it is possible for a liner of predetermined thickness to be formed having different physical and thermal characteristics. One objective of this is that the inner liner 23 of such a composite structure may advantageously be formed from ceramic fiber materials and binders such that it will have relatively less thermal shrinkage at high temperatures. The second liner 24 may then be formed from the ceramic fiber materials and binders with the resulting liner having a characteristically higher shrinkage at high temperatures. This dual liner construction thus permits a lower fabricating cost as the inner liner having a relatively lower thermal shrinkage is relatively more expensive as compared to the outer liner.

Other factors may also be considered in a combination of two liners to achieve particular physical and thermal objectives. For example, in another preferred embodiment, the instant invention provides a method for making refractory linings and insulation products wherein materials such as, but not limited to, mineral wool and/or graphite felt can be used in place of or in addition to ceramic fiber within the metal jacket of a duct, fitting or commercial heating component.

Figure 3:
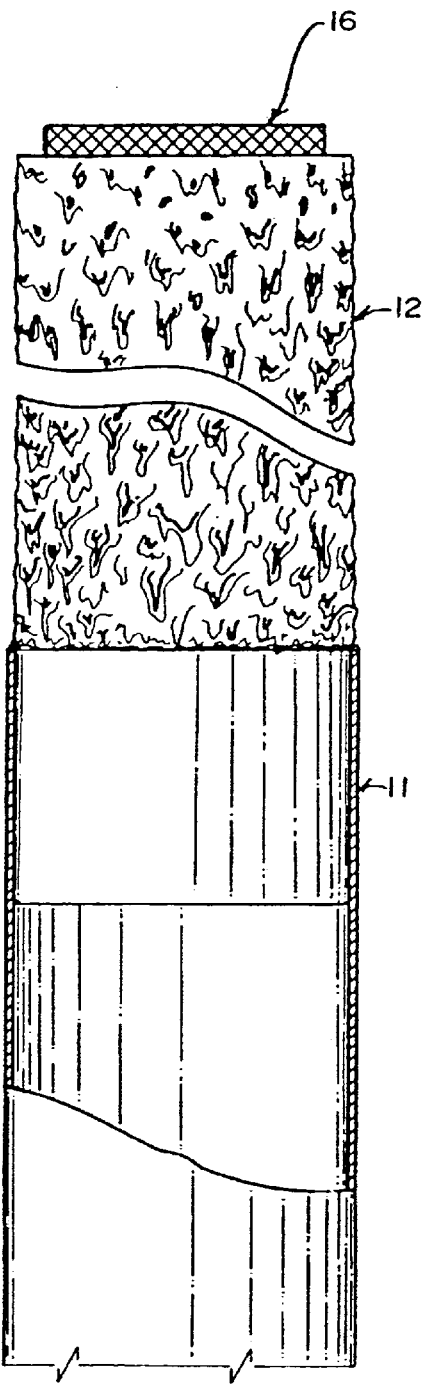
FIG. 3 is a diagrammatic illustration of the process of assembly of the ceramic sleeve in a wet form into a metal tube.

Assembly of the dual liners 23 and 24 with the supporting tube may be effected in substantially the same manner as described with respect to the assembly shown in FIG. 3. A first liner 24 is placed within the supporting tube 21 with its die then being removed. A second or innermost liner 23 may then be similarly placed within the outer liner in the same manner and its respective forming die then removed. The assembled liners and supporting tube may then be subjected to an appropriate drying procedure to remove the water. With the water being removed, the two liners then maintain their respective coaxial aligned positions through frictional and adhesive forces as is the assembly retained within the supporting tube.

It will be understood that the dimensions given for the illustrative duct are for purposes of example and that the duct may be fabricated in any desired size and configuration. It will also be understood that the illustrative dimensional thickness of the refractory liner is also for purposes of example and its thickness may be varied depending upon the particular installation in which the duct will be placed. Also, the specific ceramic fiber materials and binders will be selected on the basis of the structural and thermal characteristics desired for the particular duct.

In the present invention, there is also provided high-temperature vacuum-formed ceramic fiber insulation, as well as a coating used for passive fire protection applications such as in commercial construction, manufactured products, transportation, and industrial construction market segments. These materials can be used, for example, to control the spread of flames and to limit an increase in temperature in order to prevent or contain the outbreak of fire. Potential applications include fireproof storage cabinets and safes, hazardous material storage and transportation containers, ventilation and grease ducts, electrical and telecommunication conduits, and cable trays.

It will be readily apparent that a novel and particularly advantageous refractory duct, fitting or industrial heating component is provided by this invention. It will also be readily apparent that the method of its fabrication results in economy of assembly and produces a unitary structure wherein the refractory liner and supporting metal jacket are retained in mechanical inter-engagement.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

As used herein and in the following claims, articles such as "the", "a" and "an" can connote the singular or plural.

All documents referred to herein are specifically incorporated herein by reference in their entireties.

We claim:

1. A method of making refractory lined ducts having an elongated, structurally supporting tube and a liner carried on an interior wall of the duct comprising:
   a) forming a sleeve on a structurally supportive die in a hydrated state by vacuum-forming wherein said sleeve has an external wall of a configuration that is geometrically and dimensionally complemental to the interior wall of the supporting tube to form an interference fit therewith effective in mechanically retaining said sleeve and tube in fixed interengagement;
   b) inserting the sleeve, while in a hydrated state and on the die, coaxially into the supporting tube and after insertion, removing the die from the sleeve; and
   c) drying the sleeve while said sleeve is maintained in fixed position within the supporting tube to remove substantially all liquid resulting in solidification of the sleeve in a frictionally and adhesively retained relationship with the supporting tube;
   wherein said method further comprises treating said sleeve with a coating, wherein said coating comprises a mixture of: silicon dioxide powder; collodial silicon dioxide; water; and an emissivity agent.

2. A method according to claim 1, wherein said sleeve is formed from binder materials and a slurry of a material selected from the group consisting of mineral wool, graphite felt, ceramic fiber, and mixtures thereof.

3. A method according to claim 2, wherein said slurry further comprises a material selected from the group consisting of plasticizing agents, de-wetting agents, and mixtures thereof.

4. A method according to claim 1, wherein said coating comprises a mixture of: silicon dioxide powder in an amount of from about 23.0 to about 44.0 wt %; collodial silicon dioxide in an amount from about 25.0 to about 45.0 wt %; water in an amount from about 19.0 to about 39.0 wt %; and an emissivity agent selected from the group consisting of silicon hexaboride, silicon tetraaboride, silicon carbide, molybdenum disilicide, tungsten disilicide and zirconium diboride.

5. A method according to claim 1, wherein said sleeve is dried with microwave energy.

6. A method according to claim 1, further comprising combining said duct with one or more of said ducts so as to make one complete duct.

* * * * *